United States Patent
Tunkkari et al.

(10) Patent No.: US 11,182,146 B2
(45) Date of Patent: Nov. 23, 2021

(54) UPDATING FEATURES IN AN AUTOMATION DEVICE

(71) Applicant: ABB Schweiz AG, Baden (CH)

(72) Inventors: Ilkka Tunkkari, Helsinki (FI); Mikko Kohvakka, Helsinki (FI); Jyrki Kolho, Helsinki (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/910,136

(22) Filed: Jun. 24, 2020

(65) Prior Publication Data
US 2020/0401394 A1 Dec. 24, 2020

(30) Foreign Application Priority Data

Jun. 24, 2019 (EP) .................................. 19182047

(51) Int. Cl.
| | |
|---|---|
| *G06F 9/445* | (2018.01) |
| *G06F 9/44* | (2018.01) |
| *G06F 15/16* | (2006.01) |
| *G06F 12/02* | (2006.01) |
| *G06F 8/65* | (2018.01) |
| *G05B 19/4155* | (2006.01) |

(52) U.S. Cl.
CPC ............ *G06F 8/65* (2013.01); *G05B 19/4155* (2013.01); *G05B 2219/31449* (2013.01)

(58) Field of Classification Search
CPC .......... G06Q 40/04; G06Q 8/654; G06Q 8/65; G06Q 8/658; G06Q 10/087; G06Q 10/10; G06Q 30/06; G06Q 30/0611
See application file for complete search history.

(56) References Cited

U.S. PATENT DOCUMENTS

| | | | |
|---|---|---|---|
| 2012/0015642 A1* | 1/2012 | Seo ....................... | H04W 8/245 455/419 |
| 2015/0095335 A1 | 4/2015 | Reyes et al. | |
| 2016/0350519 A1 | 12/2016 | Pattyn et al. | |
| 2017/0103137 A1 | 4/2017 | Lawson et al. | |
| 2018/0359144 A1 | 12/2018 | Malaspina et al. | |

FOREIGN PATENT DOCUMENTS

WO 2019051439 A1 3/2019

OTHER PUBLICATIONS

Masarova et al., Available metrics for space of binary coded software. Measuring of the software space, 4 pages (Year: 2012).*
European Patent Office, Extended Search Report issued in corresponding Application No. 19182047.1, dated Dec. 9, 2019, 10 pp.

* cited by examiner

*Primary Examiner* — Thuy Dao
(74) *Attorney, Agent, or Firm* — Leydig, Voit & Mayer, Ltd.

(57) ABSTRACT

A user apparatus retrieves a list of current features in an industrial automation device in an industrial site, and a list of available features for the industrial automation device, and displays the lists to a user of the user apparatus. If a user input indicating that the industrial automation device is to be updated with one or more features selected amongst the available features, the one or more features are downloaded from a remote data storage to the user apparatus and therefrom to the industrial automation device to update the industrial automation device.

20 Claims, 4 Drawing Sheets

UPDATING FEATURES IN AN AUTOMATION DEVICE

RELATED APPLICATIONS

This application claims priority to European patent application no. 19182047, filed on Jun. 24, 2019, the contents of which is hereby incorporated herein by reference in its entirety.

FIELD

The present invention relates to updating features in an automation device.

BACKGROUND ART

Automation devices are devices used for controlling, for example, industrial electromechanical processes. For that purpose automation devices are equipped with hardware, for example with a microcontroller, to perform data processing required to carry out specific automation tasks. Usually, to minimize manufacturing costs, automation devices are equipped with hardware having small memory size. That means that all possible features, and/or feature versions for automation devices, the features and feature versions covering different tasks and/or different geographical locations, cannot be installed/configured to an automation device at a factory. It may be that a feature, required at a site for the specific automation task of the automation device, is missing, or there is a wrong feature version in the automation device. That may affect adversely to the process to be controlled, for example delays or production breaks may be caused. There is a need for a solution that can minimize the possible adverse effects.

BRIEF DESCRIPTION

The invention relates to a method, a user apparatus, a system and a program product, which are characterized by what is stated in the independent claims. Further embodiments are disclosed in the dependent claims.

A general aspect introduces a solution to update features in an automation device at a site.

BRIEF DESCRIPTION OF THE DRAWINGS

In the following, exemplary embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

The present invention is applicable to any user apparatus that is configurable to control any remote-controllable automation device and configurable to retrieve data from a remote data storage.

Figure 1:
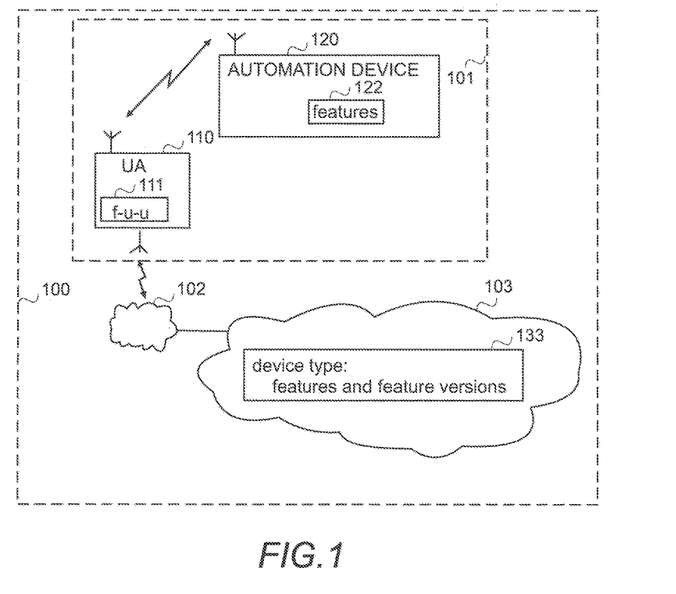
FIG. 1 shows simplified architecture of a system and block diagrams of some apparatuses.

An extremely general architecture of an exemplary system 100 is illustrated in FIG. 1. FIG. 1 is a simplified system architecture only showing some elements, functional entities, which are logical units whose implementation may differ from what is shown, and some equipment. It is apparent to a person skilled in the art that the system comprises any number of shown elements, other equipment, and structures that are not illustrated.

In the embodiment illustrated in FIG. 1, the system 100 comprises one or more industrial sites 101 (only one illustrated in FIG. 1) comprising one or more industrial automation devices 120 (only one illustrated in FIG. 1) at the industrial site 101 and one or more user apparatuses 110 (only one illustrated in FIG. 1) that may enter the industrial site 101 and be connected over one or more networks 102 to one or more clouds 103 (only one illustrated in FIG. 1) comprising a cloud storage 133.

The user apparatus 110 refers to a computing device (equipment), that may be a portable device or a non-portable device, and it may also be referred to as a user terminal or user device. Portable computing devices (apparatuses) include wireless mobile communication devices operating with or without a subscriber identification module (SIM) in hardware or in software, including, but not limited to, the following types of devices: mobile phone, smart-phone, laptop and/or touch screen computer, tablet (tablet computer), smart screen (smart display), multimedia device, and wearable devices, including augmented reality devices and virtual reality devices.

In the illustrated example of FIG. 1 the user apparatus 110 has at least two communications interfaces, depicted by 2 antennas, one to connect to the cloud 103 wirelessly over one or more networks 102 and one to connect to the industrial automation device 120 wirelessly over a local connection. It should be appreciated that the user apparatus 110 is depicted to include 2 antennas only for the sake of clarity. The number of reception and/or transmission antennas, or other communication interfaces, may naturally vary from one to any number according to a current implementation, and the user apparatus type. The local connection may be based on a short-range communication technology. A non-limiting list of examples for short-range communication technologies include Bluetooth communication standards, and other wireless local area network technologies, such as radio frequency technologies including Wi-Fi, Zig-Bee, USB Bluetooth, near field communication (NFC), radio-frequency identification (RFID), and optical wireless technologies including Li-Fi and other technologies using at least one of visible light spectrum, ultraviolet and infrared radiation. Naturally the local connection may use any mobile wireless technology, such LTE, 4G, 5G and beyond, or be a wired connection using Ethernet, for example. The wireless connection to the cloud 103 may be provided by any mobile system, such as LTE, 4G, 5G and beyond, or a combination of a wireless system and a fixed system, like Wi-Fi or Li-Fi providing access to internet, or other wired network, and via the internet, or the other wired network, to the cloud 103. The connection to the cloud 103 may be a wired connection as well. As a summary, any existing or future communication technology may be used for the local connection and for the connection to the cloud 103.

In the illustrated example of FIG. 1, the user apparatus 110 is configured to acquire (retrieve, read) information on features in the automation device 120 and features available to the automation device 120, and to update (adjust) features in the automation device 120. For that purpose the user apparatus 110 comprises a unit, called herein a feature updating unit (f-u-u) 111. The user apparatuses 110 may comprise a remote maintenance application, for example, as a mobile app, that comprises as part of the application, or as an add-in or a plug-in to the application, the feature updating unit 111. Naturally, the feature updating unit 111 may be implemented as a separate application. Below term "remote tool" is used to cover all the above implementation alternatives of the feature updating unit 111.

The industrial automation device 120, or shortly automation device, refers to electronic equipment that is used for controlling one or more industrial processes having one or more downstream devices. For example, automation devices may control the position, speed, torque and/or direction of electric motors in conveyors, grinders, winders, pumps and/or fans. An industrial automation device may control the speed and/or torque of a motor by changing the frequency, current and/or voltage of the electrical supply to the motor, for example. A non-limiting list of examples of industrial automation devices includes drives, frequency converters, AC/DC converters, DC/AC converters, DC/DC converters, programmable logic controllers, switches, motion controllers or motion drives, servo motors, soft starters, wind turbines and solar inverters. Although not separately illustrated in FIG. 1, the automation device 120 comprises a module providing at least a wireless interface to which the user apparatus 110 at the site 101 may connect to and/or via which module features and parameters of the automation device 120 may be adjusted or acquired, and the functions of the automation device 120 otherwise controlled by a person locating on the site and/or remotely from a service center (not illustrated in FIG. 1). The module may be a separate device (terminal device), or a device detachable connectable to the automation device, or equipment integrated to the automation device. At the simplest the module may be the mere wireless interface. Further, the automation device 120 comprises one or more memories 122, in which features, or a list of features, including values and/or content for features are stored. Usually the list comprises a plurality of features. It should be appreciated that term "feature" covers herein also feature versions (feature variants). A non-limiting list of examples of features include different language packets (sets) for user interaction, licenses required for application(s), or for add-ons to application(s), to run, and applications and add-ons to applications (with different versions, if two or more different versions exits). Further, the memory 122 may comprise other information, such as a code required to establish a local connection to the automation device in question.

The cloud 103 providing the cloud storage 133 may be a private cloud (operated solely for an organization), a community cloud (operated for organizations sharing e.g. mission and security requirements), a public cloud (provider sells cloud services) or a hybrid cloud, i.e. a composition of two or more different clouds. Examples of public cloud providers include Amazon Web Services (AWS), Google Cloud Platform (GCP), Microsoft Azure, etc. The one or more clouds 103 provides cloud storage 133, which is used herein as an example of a remote data storage. It should be appreciated that any other kind of remote data storage may be used as well. A cloud storage 133 is typically implemented so that even though usually a physical storage spans multiple network nodes, for example servers, sometimes in multiple locations, the data storage is logically one data storage, i.e. acting as one data storage. Usually cloud providers are responsible for keeping the data available and accessible, and the physical environment protected and running. A cloud storage may be accessed through a co-located cloud computing service, a web service application programming interface (API) or by applications that utilize the API, such as the remote tool in the user apparatus 110, for example. However, the details of clouds and cloud storages, or any remote data storage, are well known by persons skilled in the art and are, as such, irrelevant to the examples. Therefore there is no need to describe the details in more detail here.

In the illustrated example the cloud storage 133 comprises at least information on available features automation device type—specifically. Depending on an implementation, the available features may be a set of features available for free to all automation devices of the type, or a set of features including, in addition to features available for free, also available features subject to a fee (purchasable features). Naturally the cloud storage 133 may comprise other information, such as automation device—specific information, for example identification information of the automation device, type, installed/stored features (feature identifiers), available features (feature identifiers) for this device, etc. Device-specific available features may include purchasable features that have been purchased (paid or committed to be paid), such as purchased licenses and purchased language packets, which may or may not be stored in the automation device. Below term "status information" is used for automation device-specific information of an automation device comprising at least information on features stored in the automation device.

Below different examples are described merely mentioning that a connection (local connection or connection to the cloud) is established, without describing further details on a connection establishment. The details of the communication technology, including protocols used and authentication steps, if authentication is implemented, to establish a connection, are well known by persons skilled in the art, are irrelevant to the described examples, and no modifications are needed to them. Therefore, they need not to be discussed in more detail here. Further, in the examples it is assumed that a connection establishment succeeds. It should be appreciated that if a connection establishment fails, the process ends, or is restarted.

Figure 2:
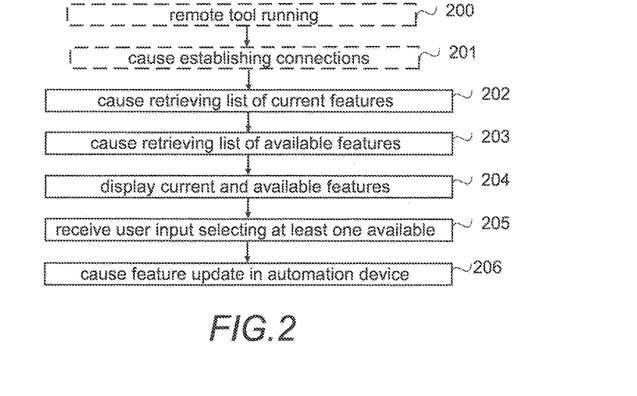
FIGS. 2, 3 and 4 are flow chart illustrating exemplary functionality.

FIG. 2 illustrates an example of a functionality of a user apparatus, and more precisely an example of a functionality of the remote tool (or the feature updating unit) the user apparatus comprises.

Referring to FIG. 2, it is assumed that the remote tool is running (step 200), and connections to the automation device and to the cloud storage are established successfully in step 201. The connection may be established in response to corresponding one or more user inputs, for example the user inputting "change features", or in response to the user apparatus entering the site, or the remote tool being started, for example. When the connection to the automation device exists, retrieving from the automation device a list of current features in the automation device is caused in step 202. Typically the list comprises names, or other feature identifiers. Further, retrieving from the cloud storage a list of available features for the automation device, using a device type of the automation device, for example, as a retrieval key, is caused in step 203. Both lists, i.e. current features and available features, are then displayed in step 204 to a user of the user apparatus. Depending on an implementation and/or user settings, both lists (current features and available features) may be displayed simultaneously, or the user may change between views, one displaying current features and another view displaying available features. Further, according to one implementation, features that are both in the list of available features and in the list of current features may be displayed only in the list of current features, in which case the displayed list of available features comprises only features not yet stored in the automation device. That facilitates selecting features to be updated in the automation device. When, or if, a user input selecting at least one of available features is detected in step 205, updating the automation device to contain the selected one or more features is caused in step 206. The updating comprises downloading one or more features via the user apparatus to the automation device. In case the list of available features contains also current features, updating an available feature which is already a current feature may include deleting the current feature and downloading the feature then as a new feature, i.e. replacing the current feature with the same feature, or it may be that no actual updating takes place, since there is no actual need for updating. After the new features are stored (updated) in the automation device, configuring the automation device with them may take place. However, since no changes are needed to the actual configuration/installation phase, there is no need to describe them in more detail with the example, or with other examples.

Figure 3:
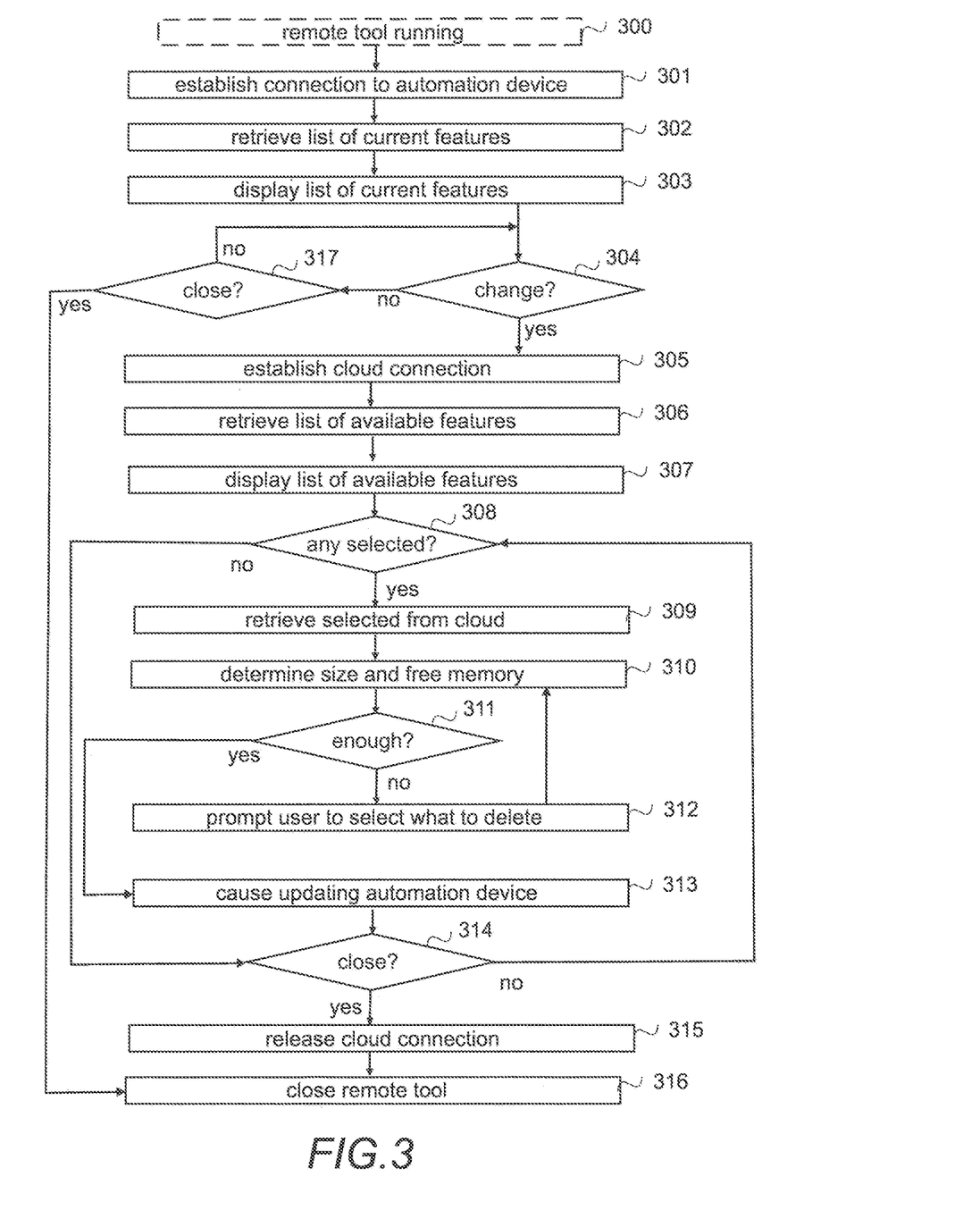

FIG. 3 illustrates another example of a functionality of a user apparatus, and more precisely another example of a functionality of the remote tool (or the feature updating unit) the user apparatus comprises.

Referring to FIG. 3, it is assumed that the remote tool is running (step 300), and a connection to the automation device is established successfully in step 301. The connection may be established in response to a corresponding user input, for example the user inputting "read features", or in response to the user apparatus entering the site, for example. When the connection to the automation device exits, retrieving from the automation device a list of current features (with variation information, if any exists) in the automation device is caused in step 302, and the list of retrieved features are displayed in step 303 to the user of the user apparatus. Then it is monitored, whether a user input indicating that the user wants to change (step 304) one or more features or a user input closing (step 317) the remote tool is received.

If the user input closing the remote tool is received (step 317: yes), the remote tool is closed in step 316.

If the user input indicating that the user wants to change/update one or more features is received (step 304: yes), a connection to the cloud comprising the cloud storage is established in step 305. When the connection is established, retrieving from the cloud storage a list of available features for the automation device, using the device type of the automation device, for example, as a retrieval key, is caused in step 306. Both lists, i.e. current features (with variation information, if any exists) and available features, including different variations, are then displayed in step 307 to a user of the user apparatus. The way the lists are displayed may depend on user settings and preferences, as explained above with FIG. 2. Naturally other views may be displayed as well. Then it is monitored whether a user input selecting one or more features in the list of available features is received (step 308) or a user input closing the remote tool is received (step 314).

If one or more features in the list of available feature are selected (step 308: yes), the selected one or more features are retrieved (downloaded) in step 309 from the cloud to the user apparatus. As described with FIG. 2, if a selected feature is also a current feature, it may or may not be retrieved. Then the size of the features is determined in step 310 as well as the size of a free memory in the automation device. Information on the size of the free memory area in the automation device may have been received when the list of current features have been retrieved, or it may be concluded from the size of memory in the automation device and sizes of current features, that may have been received with the list of current features, or corresponding information may be separately acquired from the automation device as part of step 310.

If there is not enough free memory to store the selected one or more features (step 311: no), the user is prompted in step 312 to select what to delete. In other words, the user is prompted to select amongst the current features and/or the selected one or more available features, which feature or features to delete (or not to update). Then the process returns to step 311 to determine the size of the selected available features and the size of free memory, taking into account the deletion performed in step 312.

If, or when, there is enough free memory (step 311: yes), updating features in the automation device is caused in step 313 to contain the selected one or more features. If in step 312 one or more current features were selected to be deleted, the updating in step 313 comprises deleting the features from the memory in the automation device and then adding the selected one or more features to be current features of the automation device.

After that the illustrated example continues to monitoring whether the remote tool is closed (step 314) or whether one or more available features are selected (step 308). If the remote tool is closed (step 314: yes), the connection to the cloud is released in step 315, and the remote tool is closed in step 316.

In other examples, the user may, instead of closing the remote tool, close the feature updating tool, or close a possibility to change features, or close the list of allowable features, in which case the process may release the cloud connection (step 315) and then proceeds to step 302 to update the list of current features to reflect the changes just made, or just to monitor whether the user input closes the remote tool (step 317) or indicate changing one or more features (step 304).

Figure 4:
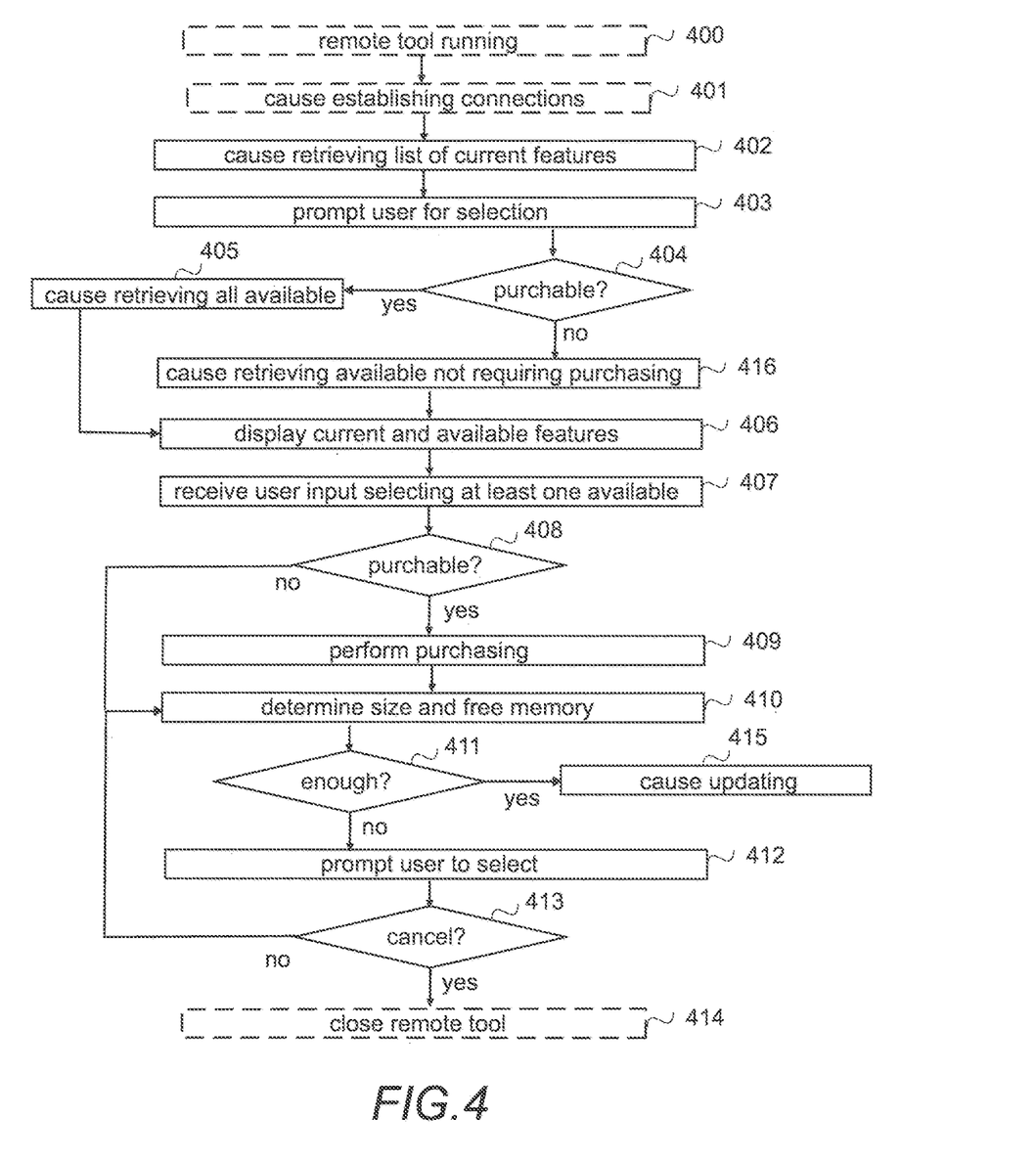

FIG. 4 illustrates a further example of a functionality of a user apparatus, and more precisely an example of a functionality of the remote tool (or the feature updating unit) the user apparatus comprises. The functionality relating to purchasable features and purchasing and the canceling functionality, or one of them, may be combined with the examples of FIGS. 2 and 3, and with examples described below with FIG. 5.

Referring to FIG. 4, it is assumed that the remote tool is running (step 400), connections to the automation device and to the cloud storage are established successfully in step 401, and retrieving from the automation device a list of current features in the automation device is caused in step 402, as explained above with FIGS. 2 and 3. Then, in the illustrated example, the user is prompted in step 403 to select whether he/she wants that all available features, including purchasable features (i.e. features not being purchased, or committed to be paid, that are not free of charge) are to be retrieved. If the user input indicates all features (step 404: yes), i.e. also purchasable features, retrieving from the cloud storage a list of all available features for the automation device, using a device type of the automation device, for example, as a retrieval key, is caused in step 405.

Both lists, i.e. current features and available features, are then displayed in step 406 to a user of the user apparatus. The way the lists are displayed may depend on user settings and preferences, as explained with FIG. 2. Further, the purchasable features may be displayed using a different colour, tone, font, style, and/or associated with a sign and/or under a subtitle, so that the user is aware of what features are "free" and what not.

When, or if, a user input selecting at least one of available features is detected in step 407, it is checked (step 408), whether any of the selected features is a purchasable feature.

If one or more purchasable features is selected (step 408: yes), the purchasing is performed in step 409. Any known or future purchasing arrangement/method may be used. The details how the purchasing is actually performed depends on various factors, and bears no significance to the example. Therefore it is sufficient to describe the purchasing in a very general level. Further, it is assumed that the purchasing succeeds. If the purchasing fails, the process may be ended, or the process may return to the selection, for example.

Then the size of the selected features is determined in step 410 as well as the size of a free memory in the automation device, as explained above with FIG. 3.

If there is not enough free memory to store the selected one or more features (step 411: no), the user is prompted in step 412 to select what to delete (see explanation with FIG. 3) or whether to cancel the process. If the user input is not cancelling the process (step 413: no), the process returns to step 410 to determine the size of the selected available features and the size of free memory, taking into account the deletion performed in step 412. If the user input is cancelling the process (step 413: yes), for example because the user is not willing to remove any existing feature, in the illustrated example the remote tool, or at least its feature updating part, is closed in step 414. If the cancelling is combined with example of FIG. 3, step 314 could be the step where the process would continue after the user input "cancel". Thanks to the cancelling possibility the user may cancel the updating process without deleting existing features.

If, or when, there is enough free memory (step 411: yes), updating features in the automation device is caused in step 415 to contain the selected one or more features, as described above with FIGS. 2 and 3.

If no purchasable feature is selected (step 408: no), the process proceeds directly to step 410 to determine the size of the selected available features and the size of free memory.

If the user input relating to available features, which are to be retrieved, indicates no purchasable features (step 404: no), retrieving from the cloud storage a list of those available features for the automation device, which are downloadable at the retrieval time free of charge, using a device type of the automation device, for example, as a retrieval key, is caused in step 416. Then the process continues to step 406 to display the lists.

In another implementation step 416, i.e. retrieving available features not requiring purchasing is performed before step 403, i.e. before the user is prompted to select whether also features requiring purchasing are retrieved. In the implementation the prompting may be skipped if during retrieval it is noted that there are, for the device type, no features requiring purchasing.

In another implementation relating to actual purchasing, the purchasing may be performed just before updating is caused, i.e. step 409 is performed after "yes" answer in step 411, and then the process continues to step 415.

In a still further implementation relating to the purchasing, the user may be prompted to purchase features before they are displayed to him/her and/or made selectable for the update procedure.

Figure 5:
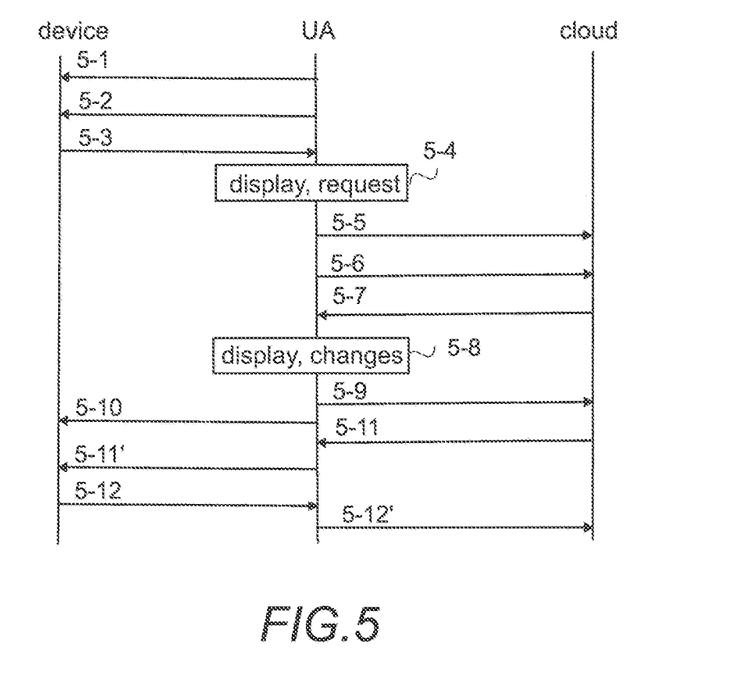
FIG. 5 illustrates exemplary information exchange.

FIG. 5 illustrates exemplified information exchange with different use examples (first, second, third and fourth example). In all examples it is assumed that the remote tool is running in a user apparatus (UA) which is in the industrial site in which an automation device (device) locates, and succeeds to establish a connection to the automation device and to the cloud storage (cloud), the connection establishments including possible pairing processes, authentications, etc. (not disclosed in detail). It should be appreciated that if either of the connection establishments fails, the information exchange will not continue further. Further, in each of the examples it is assumed that the user of the remote tool changes (updates) at least one feature (feature variation) in the automation device, otherwise the illustrated information exchange may end either at point 5-4 or at point 5-8.

In a first example it is assumed that the cloud storage maintains also status information of the automation device, the status information being associated with identification information of the automation device. The device type of the automation device may be concluded from the identification information, for example, it may be part of the identification information, or the device type may be associated, in the cloud storage, with the identification information. Therefore, an identifier of the automation device is used as the information indicating the device type. Naturally, information on the device type may be retrieved as a separate information, and send in addition to the identification information of the automation device.

Referring to FIG. 5 and the first example, the user apparatus (UA) establishes a connection (message 5-1) to the automation device (device), and then sends in message 5-2 a request for a list of features to the automation device. In other words, the list of current features is acquired.

The automation device (device) sends in message 5-3 the list of current features to the user apparatus (UA). The list is displayed in point 5-4 to the user of the user apparatus, and a user input requesting retrieval of list of available features is received in point 5-4. Since there is no connection to the cloud, the request triggers connection establishment to the cloud (depicted by message 5-5), and once the connection has been established, the remote tool causes the user apparatus (UA) to send message 5-6, which requests a list of available features for the automation device, the message containing identification information of the automation device.

Using the identification information as a retrieval key (search key) in the cloud storage, list of available features is retrieved and sent in message 5-7 to the user apparatus. The list of available features may contain all available features (free and purchasable) for the device type, or all free features and all purchased features, or a subset created using the status information. The subset may contain features (and feature versions) that are not indicated in the status information as current features, and/or that have a later date than the date the status information was updated.

The list of available features is displayed in point 5-8 to the user of the user apparatus. The way the two lists are displayed may depend on user settings and preferences, as explained above with FIG. 2. Then one or more user inputs causing changing one or more features are received in point 5-8. Such user inputs include deleting a current feature, updating a current feature to be in accordance of an available feature (for example there is a newer version), installing (downloading) an additional feature to a current feature and installing a new feature. In the example, the remote tool is configured to keep track to the changes, and in response to a user input requesting performing the updating of the features, cause sending message 5-9 to the cloud storage and message 5-10 to the automation device. In the illustrated example, message 5-10 contains a request/instructions to update the features in the automation device, and information on features that are to be deleted from the automation device, if any features are to be deleted. Message 5-9 contains information on features that are indicated to be updated. The information is used to download, i.e. retrieve, the features from the cloud storage and to download the features (one or more messages 5-11) to the user apparatus (UA). The download (retrieval) may comprise purchasing steps for a purchasable feature. The user apparatus (UA) then downloads, i.e. stores, the features to the automation device (one or more messages 5-11'), as indicated in message 5-10. In another implementation message 5-10 and messages 5-11' are combined to be one or more messages requesting update/changes to the current features, including indication of features to be deleted and downloaded features.

Once the updating (messages 5-10 and 5-11') has been performed in the automation device (device), the automation device acknowledges in message 5-12 the changes to the user apparatus. The acknowledgement may be a mere "ok", or indicate deleted features (using feature identifiers, for example), and updated/added features (for example, using feature identifiers, possible with version indicators). The user apparatus forwards the acknowledgement, with identification information of the automation device, in message 5-12' to the cloud storage which then updates the status information correspondingly.

Also in a second example it is assumed that the cloud storage maintains the status information of the automation device. However, in the second example the status information is used also for current features. Referring to FIG. 5 and the second example, the process is as described above with the first example to the point the connection (message 5-5) has been established to the cloud and the remote tool causes the user apparatus (UA) to send message 5-6. In the second example message 5-6 is a request for both a list of available features for the automation device and a list of current features of the automation device, the message containing identification information of the automation device.

Using the identification information as a retrieval key (search key) in the cloud storage, list of available features, and a list of current features in the status information, are retrieved and sent in message 5-7 to the user apparatus.

The list of available features is displayed in point 5-8 to the user of the user apparatus. Examples of how to display are described with FIG. 2. Further, the list of current features retrieved from the cloud storage is compared in point 5-8 with the list of current features retrieved from the automation device, and discrepancies, if any exists, are also shown to the user. For example, a displayed current feature not having a counterpart in current features retrieved from the cloud storage may be displayed with a different colour, and/or the user is prompted to solve the discrepancy (solving meaning updating the feature in the automation device, or indicating to the cloud storage the feature as updated to the already existing current feature in the automation device so that next time there should be no discrepancy). Then the process continues as described above with the first example, and is not repeated in vain herein.

A third example is also based on a solution in which the status information is maintained in the cloud storage and comprises information on current features in an automation device. In the third example only feature information in the cloud storage is used. Referring to the third example and FIG. 5, messages 5-1 to 5-3 include connection establishment and receiving identification information of the automation device but no list of current features. Instead of displaying a list of current features in point 5-4, selection alternatives comprising at least a selection "read current and available features" are displayed to the user of the user apparatus. When a user input selecting said selection is detected, a connection establishment (message 5-5) is caused and after that the list of current features and the list of available features are retrieved (messages 5-6, 5-7), using the identification information as a retrieval key. The retrieved lists, i.e. the list of current features and the list of available features are displayed in point 5-8 to the user (the list of available features may comprise all, or only those not displayed in the list of current features, as explained with FIG. 2). After that the process continues as described with the first and second example. It should be appreciated that if the selection alternatives displayed in point 5-4 contain "read current features", and that is selected, the connection to the cloud is established (message 5-5) and current features retrieved (messages 5-6, 5-7). Then the process continues as in point 5-4 of the first example, except that since there is already a connection to the cloud, there is no need to establish it (i.e. message 5-5 is not send again).

In a fourth example no status information is maintained in the cloud storage, and it is assumed that an automation device transmits, either with the current features, or during connection establishment the device type, or corresponding information indicating the device type directly. It should be appreciated, that the fourth example may be implemented also when the device type of the automation device is concluded from the identification information, as explained above with the first example. Referring to FIG. 5 and the fourth example, the information exchange is similar to the one described with the first example until the remote tool causes the user apparatus (UA) to send message 5-6. In the fourth example message 5-6 requests a list of available features for the automation device, the message containing the device type of the automation device as a search key. Using the device type as a search key in the cloud storage, list of available features is retrieved and sent in message 5-7 to the user apparatus. The list of available features may contain all available features for the device type, including purchasable features (with no information whether they are bought or not since that would require status information). Therefrom the process continues in point 5-8 in the same way as explained above with the first example. However, after the updating has been performed in the automation device (device), it may be that no acknowledgements (messages 5-12, 5-12') are sent.

As is evident from the above examples, it is easy to update an automation device at a site, without increasing, at least in most cases, the memory size in the automation device, and even introducing features not available when the automation device was at the factory, is easy and smooth. This extends the service life of an automation device. Further, since the features can be updated at the site, there is no need to transport the automation device to the factory for updates.

This shortens production breaks. The use of remote data storage (cloud storage), and the user apparatus retrieving features from the remote data storage (cloud storage) ensures that a production break is shortened, since there is no need for pre-downloaded features. Hence, no break in updating/production is caused by a user of the user apparatus forgetting to pre-download to the user apparatus a feature to be installed to the automation device prior to entering the site. In addition, since the list of available features is retrieved (instead of downloading all available features) and only those available features that are to be installed are downloaded, use of network resources are minimized and they are not used in vain. Further, by downloading a feature to the automation device at the time when the feature is to be installed, it is ensured that no outdated version is taken into use.

For example, it is easy to update the automation device to comprise, instead of or, if memory size allows, in addition to, a default language file, such as English, with a local language file, such as Finnish, or Chinese, for example. Thanks to that, at the factory default factory settings may be used, thereby speeding up the manufacturing process, while the updating to the local language can be taken care smoothly, and without requiring to store all possible local languages to the automation device. Thanks to the local language, the end user working at the site and controlling the automation device, or one or more processes via the automation device, can use the most familiar language, and thereby concentrate on his/her controlling tasks. Another example is that features, which require a license, such as programming languages defined by International Electrotechnical Commission (IEC) for control programs within programmable logic controllers, different functional safety protocols and fieldbus protocols, can be downloaded and/or installed at the site, when needed—it is not any more necessary to be installed (configured) to the automation device at the factory.

Since new features, such as a new language file, or a new application software (application program), or for example an application software for automating or optimizing functionality of an application, which has not been earlier supported, can be downloaded to the automation device to update its functionality. Further, features, which are processes/applications/add-ons to application, running above the firmware, i.e. not features updating the firmware, such as the features in above examples, can be updated or downloaded as new features without any change or update to the firmware. This is advantageous especially in cases where the firmware has been tested and validated for the specific purpose.

The steps/points, related functions, and information exchanges described above by means of FIGS. 2 to 5 are in no absolute chronological order, and some of them may be performed simultaneously or in an order differing from the given one. Other functions can also be executed between them or within them, and other information may be sent. For example, purchasing new features may cause additional steps, or information exchange. Some of the steps/points or part of the steps/points or one or more pieces of information can also be left out or replaced by a corresponding step/point, or part of the step/points, or one or more pieces of information. For example, cancelling the updating may cause leaving something out. Further, it should be appreciated that usually a list of features comprises two or more features.

The techniques and methods described herein may be implemented by various means so that a user apparatus configured to implement at least partly on what is disclosed above with any of FIGS. 1 to 5, including implementing one or more functions/operations described above with an example, for example by means of any of FIGS. 2 to 5, comprises not only prior art means, but also means for implementing the one or more functions/operations of a corresponding functionality described with an example, for example by means of any of FIGS. 2 to 5, and it may comprise separate means for each separate function/operation, or means may be configured to perform two or more functions/operations. For example, one or more of the means and/or the feature updating unit, or its sub-units, described above may be implemented in hardware (one or more devices), firmware (one or more devices), software (one or more modules), or combinations thereof. For a hardware implementation, the embodiments/examples may be implemented within one or more application-specific integrated circuits (ASICs), digital signal processors (DSPs), digital signal processing devices (DSPDs), programmable logic devices (PLDs), field programmable gate arrays (FPGAs), radio-frequency circuits (RFICs), graphic processing units (GPUs), processors, controllers, micro-controllers, microprocessors, logic gates, other electronic units designed to perform the functions described herein by means of FIGS. 2 to 5, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, the memory unit can be communicatively coupled to the processor via various means, as is known in the art. Additionally, the components of the user apparatus (device/computing devices) described herein may be rearranged and/or complemented by additional components in order to facilitate the achievements of the various aspects, etc., described with regard thereto, and they are not limited to the precise configurations set forth in the given figures, as will be appreciated by one skilled in the art.

Figure 6:
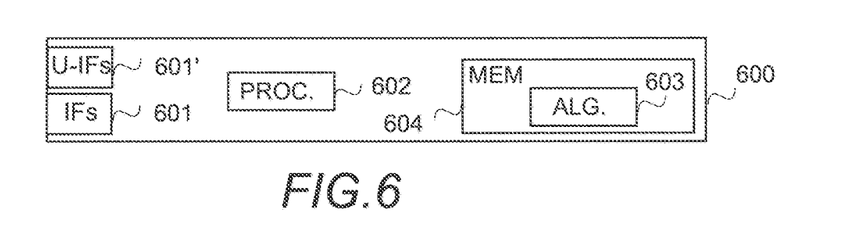
FIG. 6 is a block diagram of an exemplary user apparatus.

FIG. 6 provides a user apparatus (user device) according to some embodiments/examples of the invention. FIG. 6 illustrates an apparatus 600 configured to carry out the functions described above in connection with the user apparatus and/or the feature updating unit. Each user apparatus 600 may comprise one or more processing circuitry, such as at least one processor 602, and at least one memory 603, including one or more algorithms 604, such as a computer program code (software) wherein the at least one memory and the computer program code (software) are configured, with the at least one processor, to cause the apparatus to carry out any one of the exemplified functionalities of the user apparatus, or the feature updating unit. The apparatus 600 may further comprise different interfaces 601, 601', such as one or more interfaces 601 for communication, and one or more user interfaces 601' to user interaction. The one or more user interfaces 601' may be any kind of a user interface, for example a screen, or other display, microphone and one or more loudspeakers for interaction with the user.

Referring to FIG. 6, at least one of the processing circuitries in the user apparatus 600 is configured to provide the corresponding user apparatus functionality or the feature updating unit, or its sub-units, and to carry out functionalities, described above by means of any of FIGS. 2 to 5, by one or more circuitries.

The memory 604 or part of it may be implemented using any suitable data storage technology, such as semiconductor based memory devices, flash memory, magnetic memory devices and systems, optical memory devices and systems, fixed memory and removable memory.

The one or more interfaces 601 may comprise communication interfaces comprising hardware and/or software for realizing communication connectivity according to one or more communication protocols.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application.

In an embodiment, the at least one processor, the memory, and the computer program code form processing means or comprises one or more computer program code portions for carrying out one or more operations of a user apparatus according to any one of the embodiments/examples of FIGS. 2 to 5, or operations thereof.

Embodiments and/or examples as described may also be carried out in the form of a computer process defined by a computer program or portions thereof. Embodiments and/or examples of the methods described in connection with FIGS. 2 to 5 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the examples and/or embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment/example. It will be obvious to a person skilled in the art that, as technology advances, the inventive concept can be implemented in various ways. Further, it is clear to a person skilled in the art that the described examples may, but are not required to, be combined with other examples in various ways.

The invention claimed is:

1. A method comprising:
retrieving, by a user apparatus, a list of current features in an industrial automation device in an industrial site;
retrieving, by the user apparatus, a list of available features for the industrial automation device;
displaying the lists in the user apparatus;
receiving, in the user apparatus, a user input indicating that the industrial automation device is to be updated with one or more features selected amongst the available features;
determining by the user apparatus, a size required to store the one or more features and a size of a free memory in the industrial automation device;
comparing, by the user apparatus, the size required with the size of the free memory;
causing, by the user apparatus, in response to the size required not being bigger than the size of the free memory, downloading the one or more features from a remote data storage via the user apparatus to the automation device to update features in the automation device;
performing, in response to the size required being bigger than the size of the free memory, following:
prompting a user of the user apparatus to select one or more features to be deleted amongst at least one of the current features and the one or more features selected;
repeating the determining, comparing and prompting until the size required is not bigger than the size of the free memory; and
causing the updating the industrial automation device by deleting features and downloading features accordingly.

2. The method of claim 1, further comprising:
receiving a user input indicating at least retrieval of the list of the available features from the remote data storage; and
establishing, in response to said user input, a connection from the user apparatus to the remote data storage, to retrieve the list of the available features.

3. The method of claim 1, wherein the retrieving the list of available features comprises using a device type of the industrial automation device as a retrieval key.

4. The method of claim 1, further comprising:
receiving a user input indicating retrieval of the list of the current features; and
establishing a connection from the user apparatus to the industrial automation device to retrieve said list of the current features from the automation device.

5. The method of claim 1, further comprising:
sending an acknowledgement of the updating to the remote data storage, the acknowledgment indicating features updated in the industrial automation device.

6. The method of claim 1, further comprising:
receiving a user input indicating canceling; and
stopping the process in response to the user input indicating canceling.

7. A user apparatus comprising
at least one processor; and
at least one memory including computer program code, the at least one memory and computer program code configured to, with the at least one processor, cause the apparatus at least to:
retrieve a list of current features in an industrial automation device in an industrial site;
retrieve a list of available features for the industrial automation device;
display the lists in the user apparatus;
determine, in response to receiving a user input indicating that the industrial automation device is to be updated with one or more features selected amongst the available features, a size required to store the one or more features and a size of a free memory in the industrial automation device;

compare the size required with the size of the free memory;

cause, in response to the size required not being bigger than the size of the free memory, downloading the one or more features from a remote data storage via the user apparatus to the automation device to update features in the automation device;

prompt, in response to the size required being bigger than the size of the free memory, a user of the user apparatus to select one or more features to be deleted amongst at least one of the current features and the one or more features selected; repeating the determine, compare and prompt until the size required is not bigger than the size of the free memory; and causing the updating the industrial automation device by deleting features and downloading features accordingly.

8. The user apparatus of claim 7, wherein the at least one memory and computer program code configured to, with the at least one processor, cause the user apparatus to perform establish, in response to receiving a user input indicating at least retrieval of the list of the available features from the remote data storage, a connection from the user apparatus to the remote data storage, to retrieve the list of the available features.

9. The user apparatus of claim 7, wherein the at least one memory and computer program code are configured to, with the at least one processor, cause the user apparatus to use a device type of the industrial automation device as a retrieval key to retrieve the list of available features.

10. The user apparatus of claim 7, wherein the at least one memory and computer program code are configured to, with the at least one processor, cause the user apparatus to establish, in response to receiving a user input indicating retrieval of the list of the current features, a connection from the user apparatus to the industrial automation device to retrieve said list of the current features from the automation device.

11. The user apparatus of claim 7, wherein the at least one memory and computer program code are configured to, with the at least one processor, cause the user apparatus to send an acknowledgement of the updating to the remote data storage, the acknowledgment indicating features updated in the industrial automation device.

12. The user apparatus of claim 7, wherein the at least one memory and computer program code are configured to, with the at least one processor, cause the user apparatus to stop, in response to receiving a user input indicating canceling, the process.

13. A system comprising:
one or more industrial site;
one or more industrial automation devices, an industrial automation device locating at an industrial site and comprising a set of current features in the industrial automation device;
one or more remote data storages, a remote data storage comprising at least a set of available features for at least one automation device type;
one or more user apparatuses, a user apparatuses comprising at least one processor, and at least one memory including computer program code, the at least one memory and computer program code configured to, with the at least one processor, cause the apparatus at least to:
establish a connection to an industrial automation device at the industrial site where the industrial automation device locates;
establish a connection to a remote data storage;

retrieve a list of current features in an industrial automation device in an industrial site;
retrieve a list of available features for the industrial automation device;
display the lists in the user apparatus;
determine, in response to receiving a user input indicating that the industrial automation device is to be updated with one or more features selected amongst the available features, a size required to store the one or more features and a size of a free memory in the industrial automation device;
compare the size required with the size of the free memory;
cause, in response to the size required not being bigger than the size of the free memory, the download of the one or more features from the remote data storage via the user apparatus to the automation device to update features in the automation device;
prompt, in response to the size required being bigger than the size of the free memory, a user of the user apparatus to select one or more features to be deleted amongst at least one of the current features and the one or more features selected, and repeat the determine, compare and prompt until the size required is not bigger than the size of the free memory; and cause the updating the industrial automation device by delete feature and download features accordingly.

14. The system of claim 13, wherein the one or more remote data storages are a cloud storage.

15. The system of claim 13, wherein the industrial automation device is electronic equipment for controlling one or more industrial processes having one or more downstream devices.

16. The system of claim 15, wherein the electronic equipment is one of a drive, a frequency converter, an AC/DC converter, a DC/AC converter, a DC/DC converter, a programmable logic controller, a switch, a motion controller, a motion drive, a servo motor, a soft starter, a wind turbine and a solar inverter.

17. A non-transitory computer-readable storage medium storing one or more instructions which, when executed by one or more processors, cause the one or more processors to carry out at least:
retrieving a list of current features in an industrial automation device in an industrial site;
retrieving a list of current features in an industrial automation device in an industrial site;
retrieving a list of available features for the industrial automation device;
displaying the lists in the user apparatus;
determining, in response to receiving a user input indicating that the industrial automation device is to be updated with one or more features selected amongst the available features, a size required to store the one or more features and a size of a free memory in the industrial automation device;
comparing the size required with the size of the free memory;
causing, in response to the size required not being bigger than the size of the free memory, downloading the one or more features from a remote data storage via the user apparatus to the automation device to update features in the automation device;
performing, in response to the size required being bigger than the size of the free memory, at least the following:

prompting a user of the user apparatus to select one or more features to be deleted amongst at least one of the current features and the one or more features selected;

repeating the determining, comparing and prompting until the size required is not bigger than the size of the free memory; and causing the updating the industrial automation device by deleting features and downloading features accordingly.

18. The non-transitory computer-readable storage medium of claim 17, further storing one or more instructions which, when executed by one or more processors, cause the one or more processors to carry out at least: using a device type of the industrial automation device as a retrieval key to retrieve the list of available features.

19. The non-transitory computer-readable storage medium of claim 17, further storing one or more instructions which, when executed by one or more processors, cause the one or more processors to carry out at least one of the following:

establishing, in response to receiving a user input indicating at least retrieval of the list of the available features from the remote data storage, a connection from the user apparatus to the remote data storage, to retrieve the list of the available features; and establishing, in response to receiving a user input indicating retrieval of the list of the current features, a connection from the user apparatus to the industrial automation device to retrieve said list of the current features from the automation device.

20. The non-transitory computer-readable storage medium of claim 17, further storing one or more instructions which, when executed by one or more processors, cause the one or more processors to carry out causing sending an acknowledgement of the updating to the remote data storage, the acknowledgment indicating features updated in the industrial automation device.

* * * * *